CAPACITOR HAVING INTEGRAL STANDOFFS

Filed Nov. 28, 1966

INVENTORS
JERRY BRAIMAN
EDWIN W. SHIEH
BY [signature]
ATTORNEY

United States Patent Office 3,439,233

Patented Apr. 15, 1969

3,439,233

CAPACITOR HAVING INTEGRAL STANDOFFS

Jerry Braiman and Edwin W. Shieh, Indianapolis, Ind., assignors to P. R. Mallory & Co., Inc., Indianapolis, Ind., a corporation of Delaware Filed Nov. 28, 1966, Ser. No. 597,261
Int. Cl. H01g 9/04, 9/08
U.S. Cl. 317—230 10 Claims

ABSTRACT OF THE DISCLOSURE

An electrical capacitor including integral formations circumscribing and sealing each of the terminal wires projecting from an end of a casing encapsulating the capacitor. A plurality of standoff means are integrally formed with the one end of the casing and extend beyond the formations. The standoff means abut a mounting panel whereby the end of the capacitor casing is retained in spaced, substantially parallel relationship with the panel so that the formations are spaced from the panel.

The present invention relates to molded capacitors and more particularly to molded capacitors having a plurality of integral standoff means.

Molded capacitors are known in the prior art and have been fabricated by a variety of methods using various thermoplastic and thermosetting materials. However, it was found that when the molded capacitor was fixedly attached to a suitable mounting panel or fixedly connected to a printed circuit board or the like, a portion of the molten solder used to connect the capacitor terminal wires to the panel or board utilized the terminal wires as a conduit for traveling toward and engaging with the tit formations located around the terminal wires projecting from the terminal end of the capacitor housing. The tit formations are used to insure an adequate seal around the terminal wires. Due to the close proximity of the tit formations with the mounting panel or terminal board, the molten solder ran into contact with the tit formations before the solder had an opportunity to solidify. The molten solder caused the tit formations in turn to become molten and, therefore, seriously impaired the effectiveness of the capacitor seal.

In addition, it was found that when the tit formations formed around the terminal wires abut the panel or the board surface, a relatively small surface area of the terminal end of the capacitor housing contacts the panel or the board as compared with the entire end surface of the terminal end of the capacitor housing from which the terminal wires project. It is seen that the relatively small surface area contact is due to the engagement of the tit projections with the panel or the board. As a result thereof, the capacitor housing had a relatively small support area. When the capacitor housing was exposed to abusive handling, the terminal wires were subjected to extreme stresses and strains. As a result thereof, fracture of one or more of the terminal wires ocurred thereby disabling the capacitor.

It was found that by integrally molding standoff means in the terminal end of the capacitor housing, the standoff means served the dual function of preventing molten solder from engaging with and thereafter melting the tit formations about the terminal wires and of serving as a firm base means for stabilizing the capacitor housing during abusive handling thereof.

In addition, it was found the polarity of the terminal wires may be easily, conveniently and permanently indicated on the terminal end of the molded capacitor by molding therein coded indicia indicative of the respective polarities of the terminal wires.

The resultant space between the mounting panel and the terminal end of the capacitor facilitates removal of excess solder that may accumulate therebetween.

Accordingly, it is an object of the present invention to provide an economically encapsulated capacitor which overcomes each of the aforementioned problems in the molded capacitor art.

Another object of the present invention is to provide a molded capacitor having integral standoff means retaining the terminal end of the capacitor housing in spaced parallel relationship with respect to a mounting means.

Yet another object of the present invention is to provide a capacitor having integral standoff means providing stabilization for the capacitor housing when the capacitor is mounted on a mounting panel.

Yet another object of the present invention is to provide a molded capacitor having integral standoff means and coded indicia molded in the terminal end thereof so as to indicate the correct polarity of said terminal wires.

Still another object of the present invention is to provide a molded capacitor having integral standoff means projecting from the terminal end thereof which retain the capacitor housing in spaced parallel relationship with respect to a mounting panel or printed circuit board so as to facilitate removal of excess flux or solder from the terminal wires of the capacitor.

Yet another object of the present invention is to provide a molded capacitor having integral standoff means that accurately and automatically locate and position said capacitor housing in spaced parallel relationship with a mounting panel or printed circuit board.

A further object of the present invention is to provide a molded capacitor having integral standoff means which space tit formations circumscribing the terminal wires of the capacitor a predetermined distance from a mounting panel or printed circuit board.

Another object of the present invention is to provide a molded capacitor having integral standoff means that is characterized by its simplicity of construction and its economy of fabrication.

The present invention, in another of its aspects, relates to the novel features of the instrumentalities of the invention described herein for teaching the principal object of the invention and to the novel principles employed in the instrumentalities whether or not these features and principles may be used in the said object and/or in the said fields.

With the aforementioned objects enumerated, other objects will be apparent to those persons possessing ordinary skill in the art. Other objects will appear in the following description, appended claims and appended drawings. The invention resides in the novel construction, combination, arrangement and cooperation of elements as hereinafter described and more particularly as defined in the appended claims.

The appended drawings illustrate embodiments of the present invention constructed to function in the most advantageous modes devised by the particular application of the basic principles involved in the hereinafter described invention.

In the drawings:

FIGURE 2 illustrates the tit formations retained in spaced relationship with the board by said standoff means.

Figures 1, 2, 3, 4:
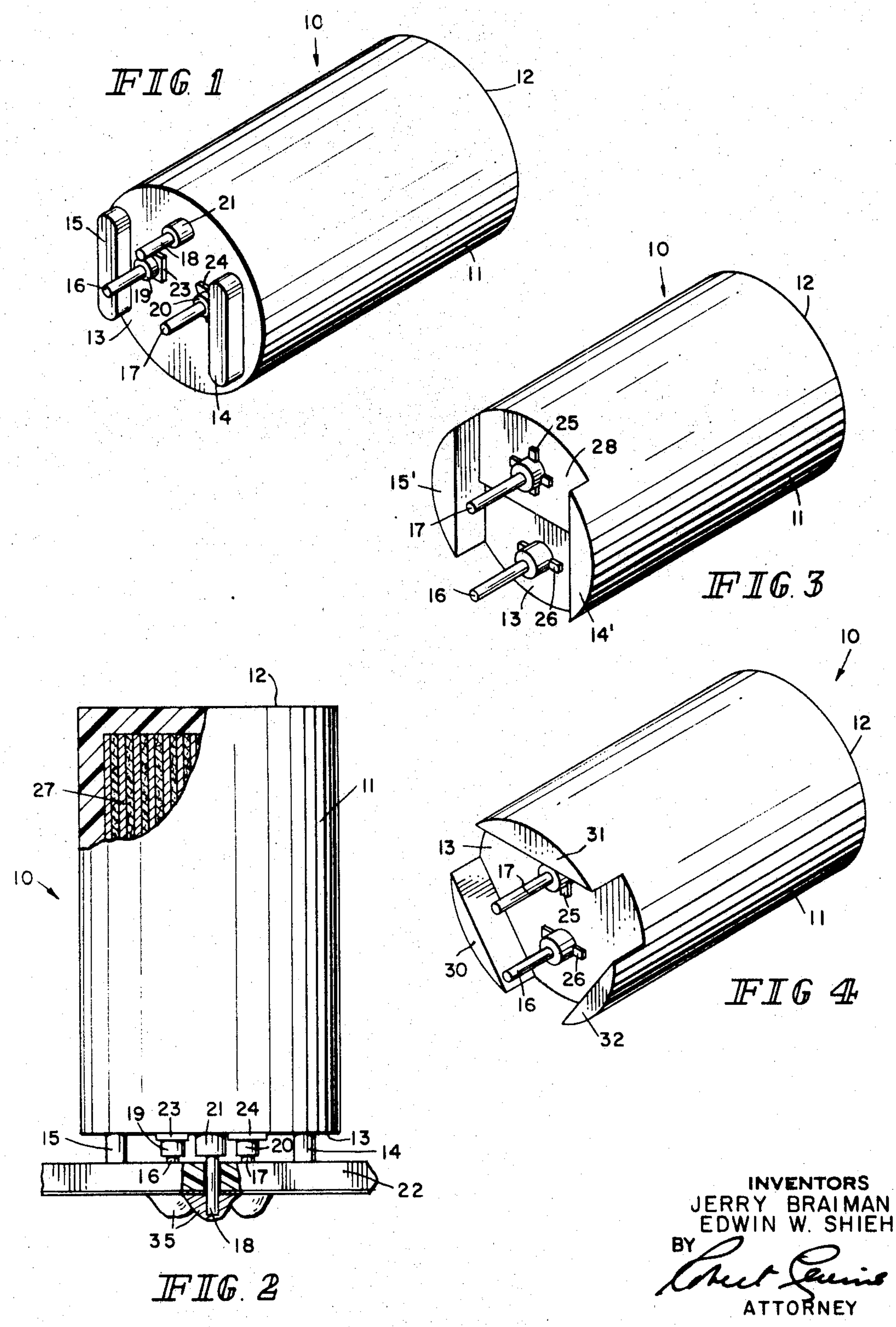
FIGURE 1 is a perspective view showing a three terminal capacitor device having integral standoff means and molded tit formations circumscribing the terminal wires for providing a seal therearound and indicating the polarity of the individual terminal wires.
FIGURE 2 is a side view of the capacitor device illustrated in FIGURE 1 showing the terminal wires thereof fixedly connected to a printed circuit board.
FIGURE 3 is a perspective view of a capacitor device illustrating a two terminal capacitor device having oppositely spaced standoff means.
FIGURE 4 is a perspective view of a two terminal capacitor device having a plurality of standoff means equally spaced about the periphery of the terminal end of the capacitor device.

Generally speaking, the present invention relates to a housing for a capacitor body comprising a molded tubular casing encapsulating a capacitor body. Terminal ends close both the extremities of the tubular casing. Terminal wires are connected to the capacitor body and project through one of the terminal ends closing the tubular casing. Tit formations circumscribe each of the terminal wires projecting from the terminal end of the capacitor body. Indicia is molded with each one of the tit formation thereby indicating the polarity of the terminal wires cooperatively associated therewith. A plurality of standoff means are integrally formed with the one terminal end of the tubular casing and extend downwardly from the terminal end. The standoff means are used for abutting a mounting panel thereby retaining the terminal end in spaced parallel relationship with respect to the mounting panel. The standoff means each have a greater height than the height of the tit formations thereby maintaining the tit formations in spaced relationship from the mounting panel.

Referring now to FIGURE 1 of the drawings, the capacitor is generally indicated by the numeral 10. The capacitor is comprised of a housing 11, terminal end 12, terminal end 13 and standoff means 14 and 15 integrally molded with terminal end 13. Terminal end wires 16, 17 and 18 projecting from terminal end 13 and molded sealing tit formations 19, 20 and 21 respectively seal terminal wires 16, 17 and 18.

The housing 12 encapsulating the capacitor body may be fabricated from any suitable thermoplastic material such as polypropylene, polyethylene, polyamide, polystyrene, polycarbonate, and polyurethane resins. In addition, the housing may be fabricated from thermosetting type resins or plastics such as epoxies, phenolics, polyesters and the like.

Tit formations 19, 20 and 21 project from the terminal end 13 and effectively seal the capacitor housing by circumscribing the terminal wires. It was found that no special plugging provisions are necessary for insuring tightness of the end seal around terminal wires 16, 17 and 18, as the enclosure material effects a secure bond thereto.

Standoff means 14 and 15 are integrally formed with terminal end 13 and project therefrom a determined distance. It should be noted that the standoff means are in spaced parallel relationship and have a substantially flat end surface for providing mounting stability when the capacitor is mounted on a mounting panel 22 as illustrated in FIGURE 2. Coded indicia 23 and 24 are integrally molded with tit formation 19 and tit formation 20 so as to indicate the positive and the negative terminal wires projecting from the terminal end of the capacitor housing. The coded indicia markings may take several suitable formations such as molded square 23, a molded star 24, molded cross 25 and molded straight line 26, thereby easily and conveniently indicating the respective polarities of the terminal wires.

FIGURE 2 shows capacitor 10 fixedly mounted on mounting panel 22. It should be noted that standoff means 14 and 15 retain the terminal end 13 of the capacitor in spaced parallel relationhip with respect to the mounting panel. The respective standoff means have height that is substantially greater than the height of the tit projections thereby maintaining the tit projections spaced from the mounting panel. Spacing of the tit projections from the mounting panel substantially prevents molten solder from engaging with the tit formations thereby preventing the formations from becoming molten thus preventing the impairment of the effectiveness of the capacitor seal. It should also be noted that the standoff means are spaced apart in a determined fashion so as to provide a firm support for the capacitor housing thereby substantially preventing deleterious wobbling of the capacitor device when mounted on the mouting panel. Solder 35 is shown fixedly attaching the terminal wires to the mounting panel.

FIGURE 2 shows the capacitor housing having a portion thereof cut away so as to illustrate the position of a convolutely wound capacitor body 27 having foil plates fabricated from any suitable film forming material such as aluminum, tantalum, and the like. The respective foil plates are separated from one another by any suitable dielectric material such as porous paper and the like. The porous paper is impregnated with any suitable electrolytes such as ethylene glycol-boric acid-ammonia compounds or the like. In addition, the capacitor body 27 may be fabricated from a sintered anode fabricated from any suitable film forming material such as for example tantalum, niobium, and the like. A solid semiconductive oxide film is formed on the sintered anode. A suitable semiconductive film would be manganese dioxide. A suitable electrolyte such as sulfuric acid is used with the capacitor anode.

FIGURE 3 shows a plurality of standoff means 14′ and 15′ and FIGURE 4 shows a plurality of standoff means 30, 31 and 32 integrally molded wtih the terminal end 13 of the capacitor and equally spaced about the periphery of the terminal end so as to provide a firm base for the capacitor housing. In addition, FIGURE 3 shows raised platform 28 formed between oppositely spaced standoff means so as to further indicate the polarity of the terminal wires 16 and 17 projecting from the terminal end of the capacitor.

While the invention is illustrated and described in embodiments, it will be understood that modifications and variations may be affected without departing from the scope and novel concepts of this invention as set forth in the appended claims.

Having thus described the invention, we claim:

1. An electrical capacitor comprising a capacitor body, a sealed casing encapsulating said body, terminal wires connected to said body and projecting through an end of said casing, respective integral tit formations projecting from said one end of the casing and circumscribing and sealing each of said terminal wires, a plurality of standoff means integrally formed with said one end of said casing and extending from said one end beyond said tit formations for abutting with a mounting panel and for retaining said one end of said capacitor casing in spaced substantially parallel relationship on the panel and for retaining said tit formations spaced from the panel.

2. The electrical capacitor of claim 1, wherein said standoff means are substantially equally spaced from each other whereby a firm support for said capacitor is provided on said panel.

3. The electrical capacitor of claim 2, wherein an odd number of said standoff means are integrally formed with said one end of said casing.

4. The electrical capacitor of claim 3, wherein said standoff means are three in number and are substantially equally spaced from the axis of said casing.

5. The electrical capacitor of claim 2, wherein an even number of said standoff means are integrally formed with said one end of said casing.

6. The electrical capacitor of claim 5, wherein said standoff means are two in number and are substantially equally spaced spaced from the axis of said casing.

7. The electrical capacitor of claim 2, wherein each of said formations includes shaped portions indicating the electrical polarity of the respective terminal wire sealed thereby.

8. The electrical capacitor of claim 2, wherein said casing, said formations and said standoffs are integrally molded from a material selected from the group consisting of a thermoplastic material and a thermosetting material.

9. The electrical capacitor of claim 8, wherein said thermoplastic material is selected from the group consisting of polypropylene, polyethylene, polyamide, polystyrene, polycarbonate and polyurethane.

10. The electrical capacitor of claim 8, wherein said thermosetting material is selected from the group consisting of epoxy, phenolic and polyester.

References Cited

UNITED STATES PATENTS

| | | | |
|---|---|---|---|
| 2,166,180 | 7/1939 | Ruben | 317—230 |
| 2,377,893 | 6/1945 | Larenzen | 317—101 |
| 3,221,217 | 11/1965 | Hucke | 317—230 |
| 3,246,272 | 4/1966 | Wiley. | |
| 3,261,902 | 7/1966 | Pearce et al. | 317—230 |
| 3,280,378 | 10/1966 | Brady et al. | 317—101 |
| 3,281,744 | 10/1966 | Melanson | 336—65 |
| 3,296,505 | 1/1967 | Sparrow et al. | 317—230 |

FOREIGN PATENTS

| | | |
|---|---|---|
| 866,289 | 4/1961 | Great Britain. |
| 872,071 | 7/1961 | Great Britain. |
| 991,648 | 5/1965 | Great Britain. |

JAMES D. KALLAM, *Primary Examiner.*

U.S. Cl. X.R.

317—260, 101